US011819787B2

(12) United States Patent
Katayama et al.

(10) Patent No.: US 11,819,787 B2
(45) Date of Patent: Nov. 21, 2023

(54) WATER-TREATING CERAMIC FILTER UNIT

(71) Applicant: PROTERIAL, LTD., Tokyo (JP)

(72) Inventors: Yoshio Katayama, Tokyo (JP); Keiko Nakano, Tokyo (JP); Toshitaka Ishizawa, Tokyo (JP)

(73) Assignee: PROTERIAL, LTD., Tokyo (JP)

( * ) Notice: Subject to any disclaimer, the term of this patent is extended or adjusted under 35 U.S.C. 154(b) by 439 days.

(21) Appl. No.: 16/973,549

(22) PCT Filed: Jun. 12, 2019

(86) PCT No.: PCT/JP2019/023336
§ 371 (c)(1),
(2) Date: Dec. 9, 2020

(87) PCT Pub. No.: WO2019/240191
PCT Pub. Date: Dec. 19, 2019

(65) Prior Publication Data
US 2021/0252439 A1    Aug. 19, 2021

(30) Foreign Application Priority Data

Jun. 12, 2018 (JP) .................. 2018-111708

(51) Int. Cl.
*B01D 35/30* (2006.01)
*B01D 39/20* (2006.01)
*C02F 1/00* (2023.01)

(52) U.S. Cl.
CPC ......... *B01D 35/306* (2013.01); *B01D 35/308* (2013.01); *B01D 39/2075* (2013.01); *C02F 1/004* (2013.01); *B01D 2201/184* (2013.01); *B01D 2201/287* (2013.01); *B01D 2201/302* (2013.01); *B01D 2201/304* (2013.01);
(Continued)

(58) Field of Classification Search
None
See application file for complete search history.

(56) References Cited

U.S. PATENT DOCUMENTS

2020/0048110 A1 * 2/2020 Nakano ................ B01J 20/3092
2020/0346149 A1 * 11/2020 Katayama .......... B01J 20/28045

FOREIGN PATENT DOCUMENTS

| JP | 55-114324 A | 9/1980 |
|----|-------------|--------|
| JP | 2000-210517 A | 8/2000 |

(Continued)

OTHER PUBLICATIONS

International Search Report of PCT/JP2019/023336 dated Jul. 23, 2019 [PCT/ISA/210].

*Primary Examiner* — Benjamin M Kurtz
(74) *Attorney, Agent, or Firm* — Sughrue Mion, PLLC

(57) ABSTRACT

A water-treating ceramic filter unit comprising a filter having pluralities of flow paths partitioned by porous ceramic cell walls and plugs alternately sealing the one-side or other-side ends of the flow paths; a housing containing the filter such that water to be treated is supplied from one end of the filter, and that the treated water is discharged from the other end of the filter; and seal members disposed on the outer edge portions of both end surfaces of the filter for longitudinally sandwiching and fixing the filter to the housing; the maximum of a gap between a side surface of the filter and the housing being equal to or less than the equivalent diameter of the flow paths.

10 Claims, 8 Drawing Sheets

(52) U.S. Cl.
CPC .... *B01D 2201/347* (2013.01); *B01D 2201/62* (2013.01); *B01D 2239/1291* (2013.01); *C02F 2201/004* (2013.01); *C02F 2303/14* (2013.01)

(56) References Cited

FOREIGN PATENT DOCUMENTS

| | | | |
|---|---|---|---|
| JP | 2002-224505 | A | 8/2002 |
| JP | 2012-091151 | A | 5/2012 |
| JP | 2016-198742 | A | 12/2016 |
| WO | 2015/199017 | A1 | 12/2015 |
| WO | 2018/198915 | A1 | 11/2018 |

\* cited by examiner

WATER-TREATING CERAMIC FILTER UNIT

CROSS REFERENCE TO RELATED APPLICATIONS

This application is a National Stage of International Application No. PCT/JP2019/023336, filed Jun. 12, 2019, claiming priority to Japanese Patent Application No. 2018-111708, filed Jun. 12, 2018.

FIELD OF THE INVENTION

The present invention relates to a water-treating ceramic filter unit for removing contaminants by adsorption.

BACKGROUND OF THE INVENTION

In the advanced water purification, water treatment systems using reverse osmosis membranes are put into practical use. As the operation of a water treatment system proceeds, contaminants are gradually adsorbed onto reverse osmosis membranes, resulting in decrease in the amount of permeating water. Accordingly, the reverse osmosis membranes are periodically washed with a cleaning liquid to remove contaminants. Because the cleaning liquid gradually deteriorates reverse osmosis membranes, a reverse osmosis membrane module should also be periodically replaced. The periodic replacement of the reverse osmosis membrane module needs the operation stop of the water treatment system for a long period of time, resulting in a low operation ratio of the water treatment system. Because the reverse osmosis membrane module cannot be reused, it should be replaced by a new one, suffering increased running cost of water treatment per a unit amount of water, including the cost of reverse osmosis membranes as expendables, their discard cost, etc.

Proposed to expand the replacement spans of reverse osmosis membrane modules are pretreatments for removing by adsorption contaminants such as organic materials, etc., which cause the fouling of reverse osmosis membranes, among those deteriorating the performance of reverse osmosis membranes, with adsorbing members disposed upstream of the reverse osmosis membrane module.

For example, JP 2012-91151 A discloses an adsorption module (water-treating filter unit) comprising an outer wall, pluralities of flow paths inside the outer wall, ceramic cell walls partitioning the flow paths and having communicating pores penetrating adjacent flow paths, and an adsorbing member (ceramic filter) contained in a housing for adsorbing organic materials in water to be treated.

As a water-treating filter unit in which a filter is contained in a housing, JP 2002-224505 A discloses a structure comprising a cylindrical filter, a filter case (housing) containing the filter, and seal members having an L-shaped cross section in a plane including a center axis of the filter, which are disposed in a region including the outer edge portion of the filter and the inner surface of the filter case (housing).

As another example of holding a filter in a housing with seal members, for example, JP 2000-210517 A discloses a structure in which an entire side surface of a ceramic filter is covered with a seal member, and at least one side surface of the ceramic filter is held in an metal frame (housing) by contact.

To increase the operation ratio of a water treatment system, a water-treating filter unit used for pretreatment desirably has a simple structure needing less time for the replacement of a filter contained in a housing. Also, to improve the adsorption ratio of contaminants by the filter, a structure of ensuring water to be treated to uniformly pass through the filter without residing is desirable.

The above prior art will be considered from these aspects. The filter in the water-treating filter module disclosed in JP 2012-91151 A has an outer ceramic wall, which has a dense structure with water permeability, but usually prevents water from leaking from the side surface of the filter because of the surface tension of water contained in the outer wall. However, as water pressure in the filter increases depending on the operation conditions and change with age of the filter, water may leak from the outer wall by difference from the outside pressure. Because the leaked water does not flow but resides in a gap between the side surface of the filter and the housing, the quality of water may become poor. In this case, harmful solutes not removed by the filter may diffuse into the filter through the outer wall, contaminating water flowing in the filter. Thus, water to be treated cannot uniformly pass through the filter, and the performance of the water-treating filter module can unlikely be kept for a long period of time.

The seal members having an L-shaped cross section, which are disclosed in JP 2002-224505 A, provide a large gap between a filter and a housing, because seal members are sandwiched by them at their both ends, resulting in a large amount of water leaking from the filter and residing in the gap. Also, water likely resides in the gap sealed by the seal members at both ends for a long period of time, deteriorating the quality of water. Thus, water to be treated cannot uniformly pass through the filter, and performance as a water-treating filter unit cannot be kept for a long period of time.

In the structure disclosed in JP 2000-210517 A, in which at least one side surface of a filter whose entire side surface is covered with a seal member is held by an outer metal frame (housing) by contact, water leaking from the side surface of the filter comes into contact with the seal member in a wide region. This structure likely deteriorates the quality of water because water residing in a small gap between the seal member and the filter particularly goes bad. Thus, performance as a water-treating filter unit cannot be kept for a long period of time. Also, it suffers a larger number of steps of replacing the filter than those of the water-treating ceramic filter units disclosed in JP 2012-91151 A and JP 2002-224505 A, because it needs a step of covering an entire side surface of the filter with a seal member, such as the operation of winding a sheet-shaped seal member around the filter or inserting the filter into the cylindrical seal member, in the production process of the water-treating ceramic filter unit, or in addition thereto.

OBJECT OF THE INVENTION

An object of the present invention is to provide a water-treating ceramic filter unit exhibiting a high adsorption ratio of contaminants captured by the filter with easy replacement of the filter contained in a housing for an improved operation ratio of a water treatment system.

SUMMARY OF THE INVENTION

As a result of intensive research, the inventors have found that the above object can be achieved by using a housing comprising flanges having outer edge portions on both end surfaces for fixing a filter via seal members disposed on the outer edge portions, with a gap between the contained filter and the housing made equal to or less than a predetermined value. The present invention has been completed based on such finding.

Thus, the water-treating ceramic filter unit of the present invention comprises a columnar filter having pluralities of flow paths partitioned by pluralities of porous ceramic cell walls and extending in one direction, a first end, a second end, pluralities of the flow paths being composed of first flow paths plugged only on the side of the first end, and second flow paths plugged only on the side of the second end;

a first elastic seal member arranged along a first outer edge portion of the first end surface of the filter, and a second elastic seal member arranged along a second outer edge portion of the second end surface of the filter; and a housing integrally comprising a supply-side lid having an inlet for supplying water to the second flow paths from outside, and a first flange abutting the first seal member disposed on the first outer edge portion; a discharge-side lid having an outlet for discharging water from the first flow paths to outside, and a second flange abutting the second seal member disposed on the second outer edge portion; and a filter container connected to the supply-side lid and the discharge-side lid and covering a side surface of the filter;

the filter being fixed by the first flange and the second flange via the first seal member and the second seal member; and the maximum of a gap between the side surface of the filter and the housing being equal to or less than the equivalent diameter of the flow paths, wherein the equivalent diameter is a value determined by measuring the cross section areas and peripheral lengths of 10 or more arbitrary flow paths in a cross section perpendicular to the longitudinal direction of the filter, averaging them to obtain the average cross section area and average peripheral length of the flow paths, and dividing a fourfold value of the average cross section area of the flow paths by the average peripheral length.

In the water-treating ceramic filter unit of the present invention, the first flow paths and the second flow paths are preferably arranged adjacently to each other. With this structure, contaminants contained in water to be treated can be efficiently removed.

In the water-treating ceramic filter unit of the present invention, the thicknesses of the first and second seal members when the filter is fixed are preferably 75% or more of those of the first and second seal members when no load is applied. This structure keeps the elasticity of the seal members for a long period of time, making it possible to maintain the performance of the ceramic filter unit of the present invention for a longer period of time.

In the water-treating ceramic filter unit of the present invention, the widths of the first and second seal members when the filter is fixed are preferably 1.5-4.0 times the pitch of the flow paths in the first and second outer edge portions. This structure keeps water tightness between the outer edge portions of both end surfaces of the filter and the housing, while maximizing the number of flow paths contributing to the removal of contaminants, thereby enhancing the adsorption ratio of the filter.

In the water-treating ceramic filter unit of the present invention, the elastic material forming the first and second seal members preferably has hardness of A30 to A80 when measured by a type-A durometer according to JIS K6253. This structure ensures water tightness by the seal member, and protects the filter from breakage in the production of the water-treating ceramic filter unit of the present invention.

In the water-treating ceramic filter unit of the present invention, the elastic material forming the first and second seal members is preferably at least one material selected from the group consisting of nitrile rubbers, ethylene-propylene-diene rubbers, and silicone rubbers. This structure enhances the resistance of the filter to acidic or alkaline water or seawater, etc. used for cleaning.

In the water-treating ceramic filter unit of the present invention, the filter preferably has flow paths partially not partitioned by the cell walls on the side surface. This structure makes it easy for water leaking from the side surface of the filter to return into the filter, suppressing the contamination of water residing in a gap between the side surface and the housing.

In the water-treating ceramic filter unit of the present invention, at least one member of the supply-side lid, the discharge-side lid and the filter container constituting the housing is preferably formed by a material different from those of the other members. This structure enhances the degree of freedom of size design taking into consideration the thermal expansion characteristics of the filter and different thermal expansion characteristics of members constituting the housing in a use environment temperature range, making it possible to maintain the performance of the water-treating ceramic filter unit of the present invention for a longer period of time.

In the water-treating ceramic filter unit of the present invention, one of the supply-side and discharge-side lids of the housing is preferably integral to the filter container. This structure reduces the number of members constituting the housing and thus the number of steps of assembling the housing, thereby making the replacement of the filter easier.

In the water-treating ceramic filter unit of the present invention, the housing is preferably formed by a material resistant to aqueous alkaline solutions. This makes the housing resistant to corrosion, expanding the usable time period of the water-treating ceramic filter unit of the present invention.

Effects of the Invention

The water-treating ceramic filter unit of the present invention exhibits a high adsorption ratio of contaminants captured by the filter and keeps adsorption performance for a long period of time, with easy replacement of a filter contained in a housing, contributing to improving the operation ratio of a water treatment system.

DESCRIPTION OF THE PREFERRED EMBODIMENTS

[1] Water Treatment System

First, a water treatment system using the water-treating ceramic filter unit of the present invention will be explained referring to FIG. 7.

Figure 7:
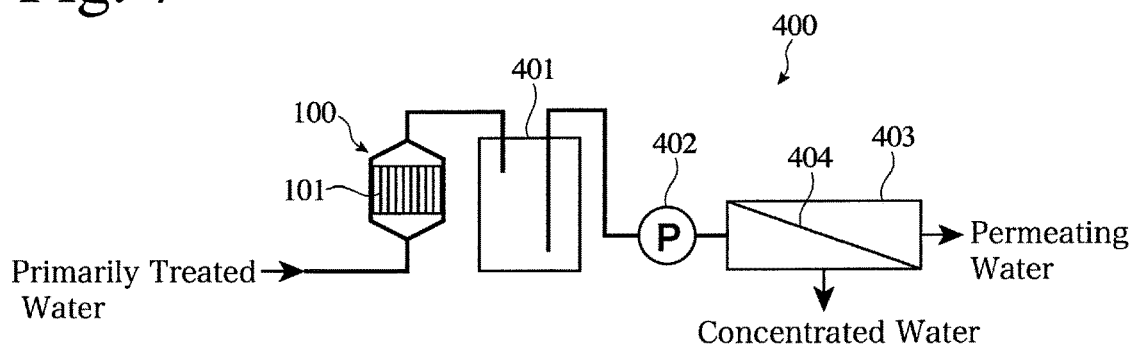
FIG. 7 is a flow diagram schematically showing a water treatment system using the water-treating ceramic filter unit of the present invention.

The water-treating ceramic filter unit 100 of the present invention is used in a water treatment system 400 as shown, for example, in the flow diagram of FIG. 7. The water treatment system 400 comprises the water-treating ceramic filter unit 100 of the present invention, a water tank 401 for storing water treated by the water-treating ceramic filter unit 100, a pump 402 for supplying water from the water tank 401, and a reverse osmosis membrane module 403 comprising reverse osmosis membranes 404 for removing materials to be separated from water supplied from the pump 402. The water-treating ceramic filter unit 100 of the present invention conducts a pretreatment step of selectively and efficiently removing organic materials, etc. by adsorption on the upstream side, which would be adsorbed to the reverse osmosis membranes 404 in the downstream reverse osmosis membrane module 403.

Water primarily treated by the removal of garbage, etc. by screens, the removal of fine suspended materials such as sand by sedimentation with a coagulant, and the decomposition of organic materials with microbes, still contains contaminants such as salts, dissolved organic materials, etc., which are hereinafter called dissolved organic materials, etc. The primarily treated water supplied to the water-treating ceramic filter unit 100 of the present invention is caused to pass through the filter 101 containing a porous ceramic honeycomb structure to remove these dissolved organic materials, etc. by adsorption, discharged from the filter 101, and then stored in the water tank 401 temporarily. Under pressure by the water-supplying pump 402, the primarily treated water stored in the water tank 401 in a predetermined amount passes through the reverse osmosis membranes 404, by which it is separated to permeating water with the dissolved organic materials, etc. removed, and concentrated water in which the dissolved organic materials, etc. are concentrated. Thus, the water-treating ceramic filter unit 100 of the present invention preliminarily removes the dissolved organic materials, etc. from the primarily treated water by adsorption to suppress the contamination of the reverse osmosis membranes 404, thereby expanding the replacement span of the reverse osmosis membranes 404.

The water-treating ceramic filter unit 100 of the present invention can be widely used in water treatment systems comprising reverse osmosis membranes for the desalination of seawater, the production of pure water used in the production of precise electronic devices such as semiconductors, etc., the advanced treatment of tap water, the reclamation of drainage water and sewage water (including those not using microbes), etc.

[2] Water-Treating Ceramic Filter Unit

Figure 1A:
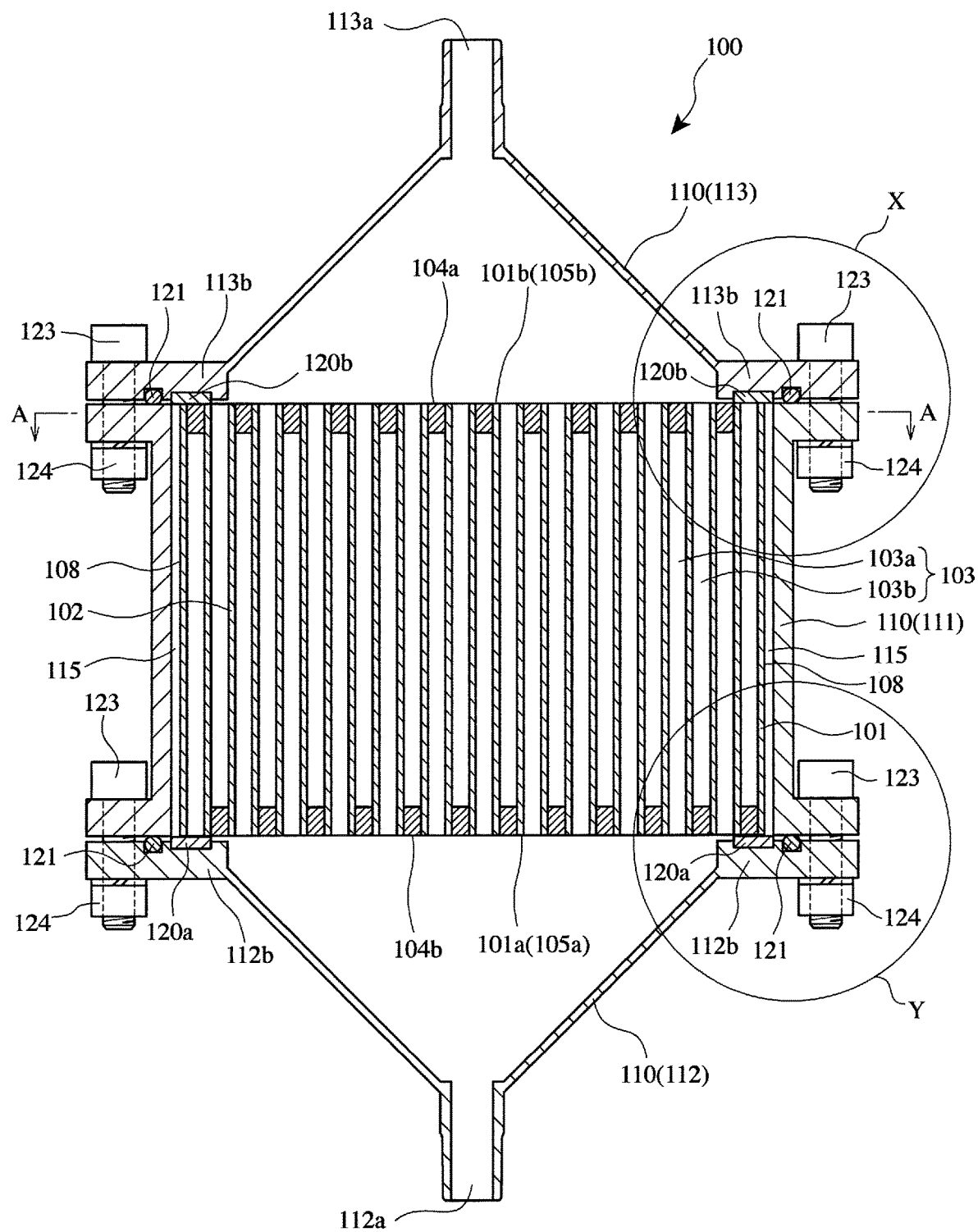
FIG. 1(a) is a cross-sectional view schematically showing an example of the water-treating ceramic filter units of the present invention with its center axis included.
Figure 1B:
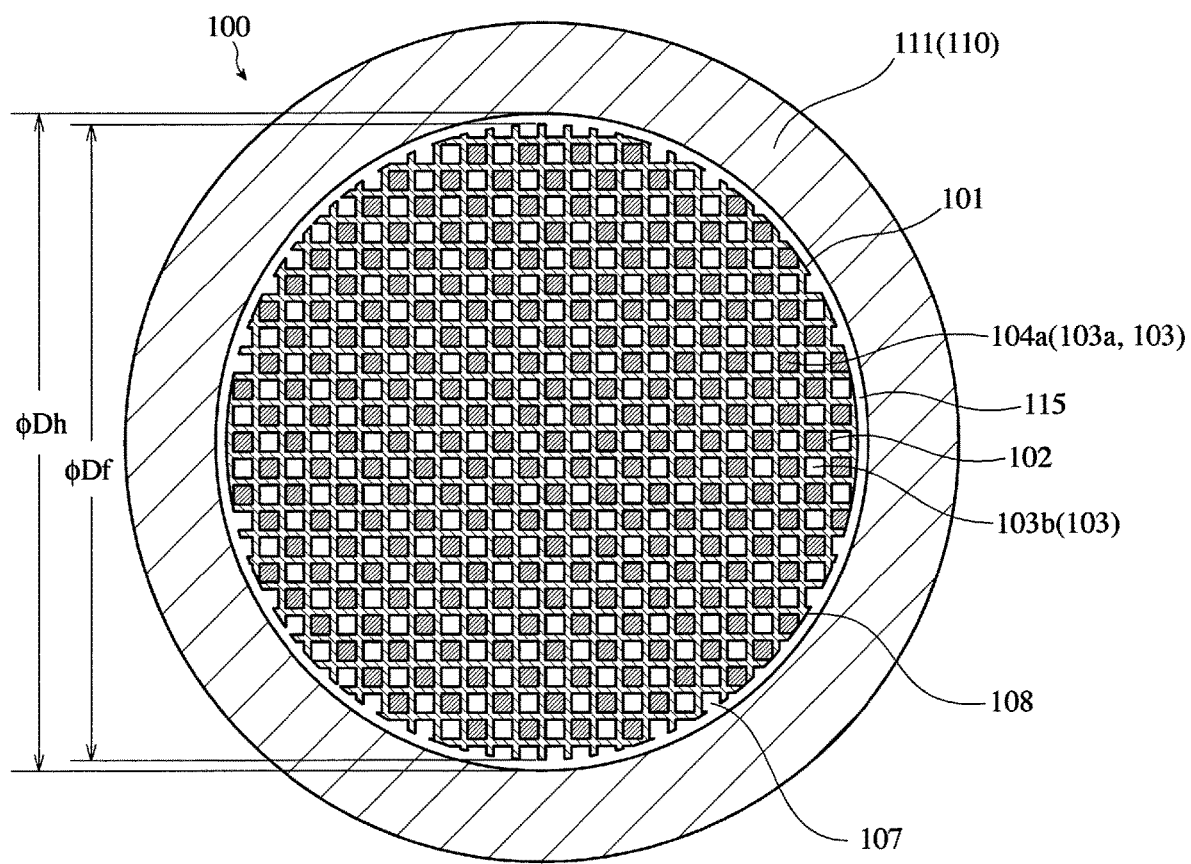
FIG. 1(b) is a cross-sectional view taken along the line A-A in FIG. 1(a).
Figure 1C:
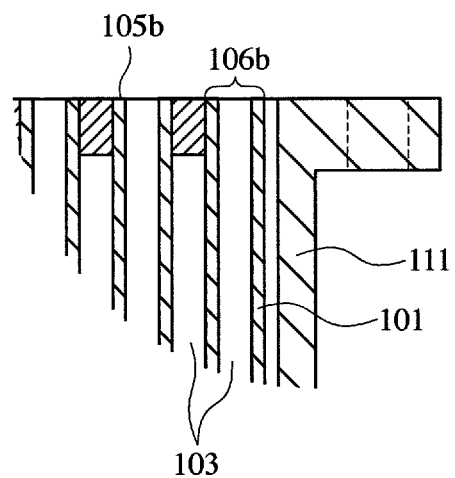
FIG. 1(c) is an enlarged view showing a portion X in FIG. 1(a).
Figure 1D:
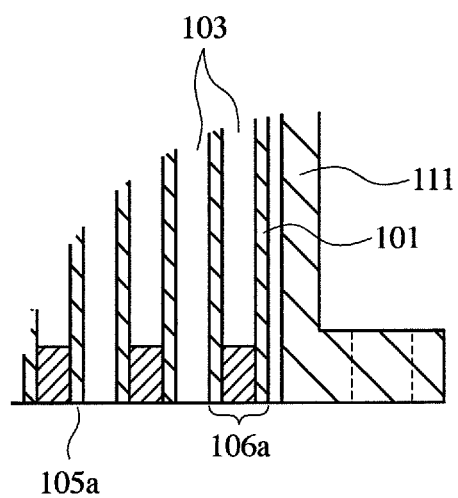
FIG. 1(d) is an enlarged view showing a portion Y in FIG. 1(a).

Next, the structure of the water-treating ceramic filter unit of the present invention will be explained. FIG. 1(a) is a cross-sectional view showing the water-treating ceramic filter unit 100 of the present invention with its center axis included, FIG. 1(b) is a cross-sectional view taken along the line A-A in FIG. 1(a), and FIGS. 1(c) and 1(d) are enlarged views showing portions X and Y, respectively, in FIG. 1(a). Bolt holes and bolts 123 in a flange of the filter container 111 are omitted in FIG. 1(b), and other portions than the filter 101 and the filter container 111 are omitted in FIGS. 1(c) and 1(d).

The water-treating ceramic filter unit 100 of the present invention comprises a columnar filter 101 having pluralities of flow paths 103 partitioned by pluralities of porous ceramic cell walls 102 and extending in one direction, pluralities of the flow paths 103 being composed of first flow paths 103b with only one-side (first) ends 101a sealed by plugs 104b, and second flow paths 103a with only other-side (second) ends 101b sealed by plugs 104a;

a first elastic seal member 120a arranged along an outer edge portion [first outer edge portion 106a, see FIG. 1(d)] of an end surface (first end surface 105a) of the filter 101 on the side of one end 101a, and a second elastic seal member 120b arranged along an outer edge portion [second outer edge portion 106b, see FIG. 1(c)] of an end surface (second end surface 105b) of the filter 101 on the side of the other end 101b; and a housing 110 integrally comprising a supply-side lid 112 having an inlet 112a for supplying water to the second flow paths 103a from outside, and a first flange 112b abutting the first seal member 120a disposed on the first outer edge portion 106a; a discharge-side lid 113 having an outlet 113a for discharging water from the first flow paths 103b to outside, and a second flange 113b abutting the second seal member 120b disposed on the second outer edge portion 106b; and a filter container 111 connected to the supply-side lid 112 and the discharge-side lid 113 and covering an side surface 108 of the filter 101;

the filter 101 being fixed by the first flange 112b of the supply-side lid 112 and the second flange 113b of the discharge-side lid 113 via the first seal member 120a disposed on the first outer edge portion 106a and the second seal member 120b disposed on the second outer edge portion 106b; and the maximum of a gap 115 between the side surface 108 of the filter 101 and the housing 110 being equal to or less than the equivalent diameter of the flow paths 103, wherein the equivalent diameter is a value determined by measuring the cross section areas and peripheral lengths of 10 or more arbitrary flow paths 103 in a cross section perpendicular to the longitudinal direction of the filter 101, averaging them to obtain the average cross section area and average peripheral length of the flow paths, and dividing a fourfold value of the average cross section area of the flow paths by the average peripheral length.

The outer edge portion is a portion extending along an outer periphery of an end surface of the filter 101, with a predetermined width toward the center axis of the filter 101, and the widths of the first and second outer edge portions 106a, 106b are as large as covering at least the outermost flow paths 103 among those opening on the first and second end surfaces 105a, 105b [see FIGS. 1(c) and 1(d)].

(1) Filter

While water supplied from outside through the inlet 112a of the water-treating ceramic filter unit 100 [see FIG. 1(a)] passes through the filter 101, the dissolved organic materials, etc. are removed, and the treated water is discharged to outside through the outlet 113a. When water passes through the filter 101, organic materials, etc. dissolved in water are removed by adsorption onto communicating pores (not shown) in the porous ceramic cell walls 102.

Accordingly, to remove the dissolved organic materials, etc. from water efficiently by adsorption, the second flow paths 103a into which the supplied water is introduced, and the first flow paths 103b from which water having the dissolved organic materials, etc. removed in the cell walls 102 is discharged are preferably arranged adjacently to each other.

(a) Honeycomb Structure

Figure 3A:
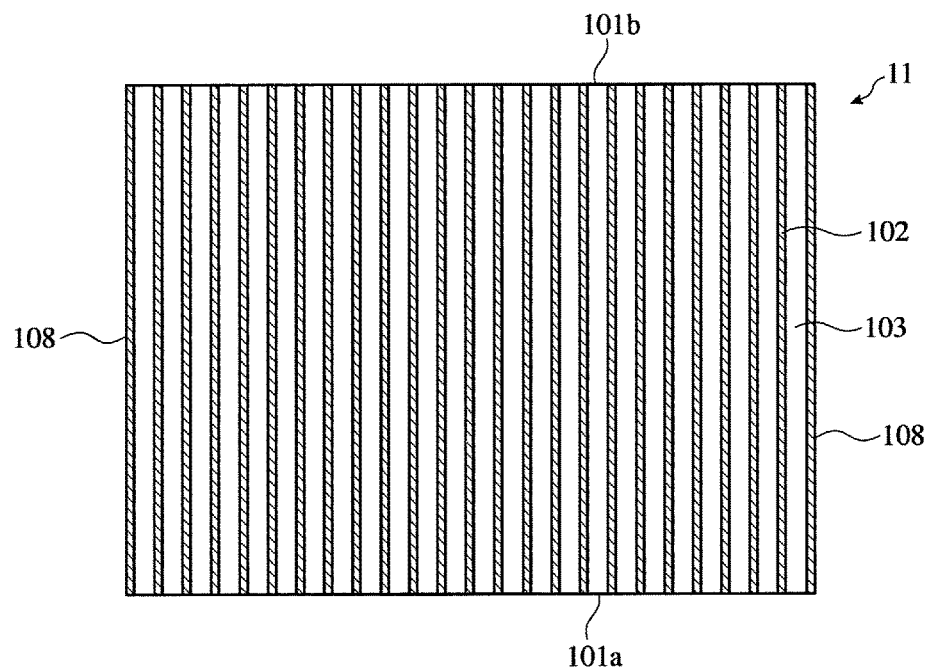
FIG. 3(a) is a cross-sectional view schematically showing an example of honeycomb structures used in the water-treating ceramic filter unit of the present invention, with its center axis included.
Figure 3B:
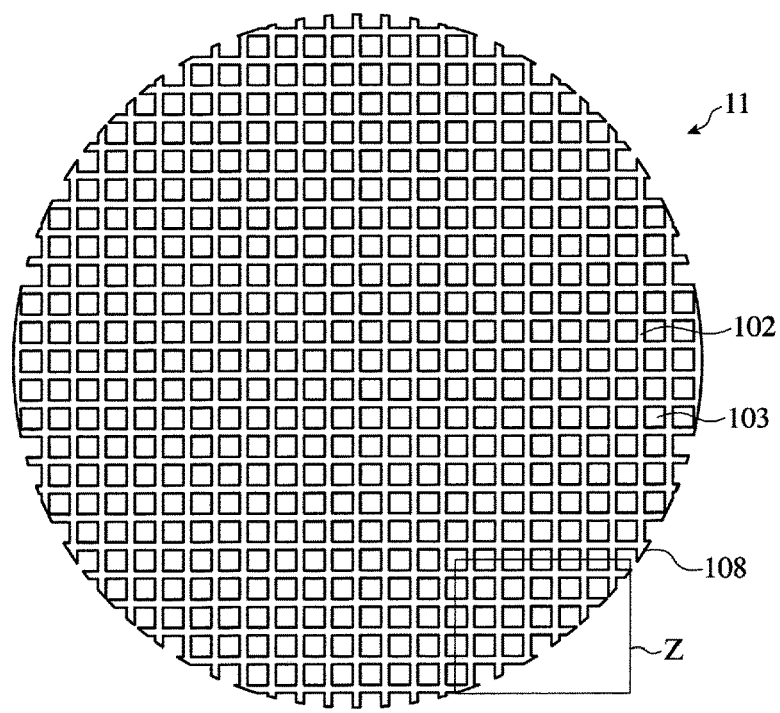
FIG. 3(b) is a schematic view of the honeycomb structure of FIG. 3(a) when viewed in the longitudinal direction.

As shown in FIGS. 3(a) and 3(b), a honeycomb structure 11 constituting the filter 101 has a columnar shape having pluralities of flow paths 103 partitioned by porous ceramic cell walls 102. Namely, the honeycomb structure 11 has a structure in which pluralities of flow paths 103 extending in a longitudinal direction (flow path direction) are arranged in a honeycomb pattern when viewed axially [see FIG. 3(b)]. Though the honeycomb structure 11 shown in FIGS. 3(a) and 3(b) is cylindrical, it is not restrictive as long as it is columnar.

A matrix forming the cell walls 102 is preferably made of ceramics having alumina, silica, cordierite, titania, mullite, zirconia, spinel, silicon carbide, silicon nitride, aluminum titanate, lithium aluminum silicate, etc. as main components. Particularly preferable for the matrix are alumina and cordierite, and cordierite is more preferable. The cordierite may be that containing cordierite as a main crystal phase, which may contain other crystal phases such as spinel, mullite, sapphirine, etc., and further glass components.

Organic materials, etc. dissolved in water to be treated are adsorbed onto communicating pores (not shown) constituted by large numbers of pores formed in the cell walls 102 partitioning adjacent flow paths 103, so that the water is purified. The median pore diameter of pores formed in the cell walls 102 is preferably 1-50 μm, more preferably 5-30 μm, and most preferably 10-20 μm. The median pore diameter is a pore diameter at a pore volume corresponding to 50% of the total pore volume, in a curve showing the relation between pore diameter and cumulative pore volume in the cell walls.

The cell walls 102 preferably have a porosity of 25-70%. When the porosity of the cell walls 102 is 25% or more, an adsorbent described later can be easily carried without clogging the communicating pores. When the porosity of the cell walls 102 is 70% or less, the cell walls 102 have enough mechanical strength to be resistant to breakage by water pressure and impact during assembling into the housing.

Figure 3C:
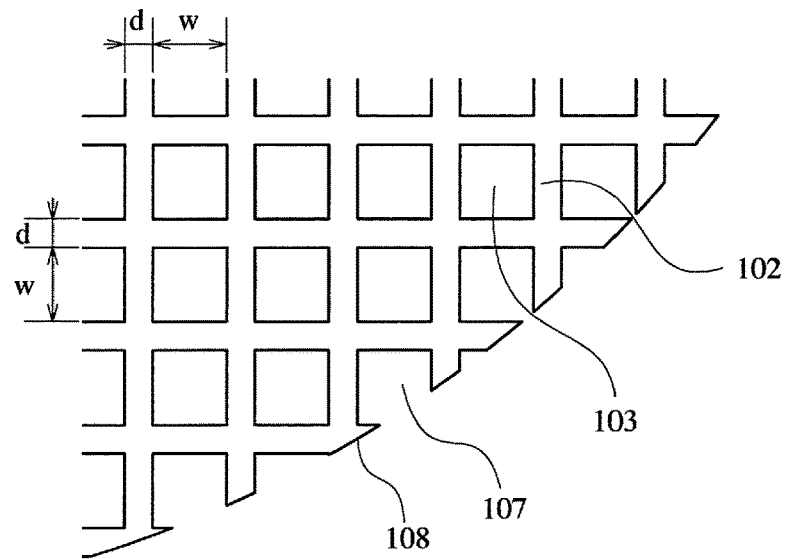
FIG. 3(c) is an enlarged view showing a portion Z in FIG. 3(b).

Though not restrictive, the cell walls 102 in the honeycomb structure 11 are preferably in a lattice pattern when viewed in a longitudinal direction. FIGS. 3(a)-3(c) show a honeycomb structure 11 having lattice-patterned cell walls 102 to have flow paths 103, which are square when viewed in a longitudinal direction. In FIG. 3(c), the thickness d of the cell walls 102 is preferably 0.1-2 mm, and a ratio d/w of the thickness d to the width w of the flow paths 103 partitioned by the cell walls 102 preferably meets $0.25 \leq d/w \leq 1.25$. With the thickness of 0.1 mm or more and/or $0.25 \leq d/w$, the cell walls 102 preferably have enough mechanical strength to be resistant to breakage by water pressure or impact during assembling into the housing. Also, the communicating pores have enough length, making it possible to carry metal oxide particles exhibiting sufficient adsorption performance. When the cell walls 102 have thickness d of 2 mm or less and/or $d/w \leq 1.25$, pressure necessary for the permeation of water is preferably small, enabling water treatment with high energy efficiency.

The cross section shape of the flow paths 103 viewed in the longitudinal direction is not restricted to square shown in FIGS. 3(b) and 3(c), but may be other quadrangles (rectangle, etc.), triangle, hexagon, or their combination, etc., though a square whose side length w is 1-8 mm is preferable. With the side length w of 1 mm or more in the flow paths 103, the openings of the second flow paths in the filter are unlikely clogged by contaminating particulates, other foreign matter than the dissolved organic materials, etc., enabling a long period of use without decreasing treatment capacity. On the other hand, with the side of 8 mm or less in the flow paths 103, the filter can have enough strength to be resistant to breakage by water pressure or impact during assembling into the housing, even when the cell walls 102 have small thickness d for lower water permeation resistance.

The cell walls 102 may carry an adsorbent for improving adsorption performance. Though the adsorbent may be the above-described ceramics (metal oxides), or resins such as nylons, aramides, polyamides, cellulose, polyethylene, etc., they are properly selected for substance to be removed because of their adsorption selectivity. As metal oxide particles, particles of α-alumina, γ-alumina, zinc oxide, copper oxide, etc. are usable. The carried adsorbent desirably has such thickness as to avoid the problem of water pressure drop, and specifically, its average thickness is preferably 1/10 or less of the median pore diameter in the cell walls. The average thickness is determined by dividing a volume calculated from the amount (weight) and specific gravity of the adsorbent by the specific surface area of the honeycomb structure 11 measured by a mercury porosimeter, etc.

(b) Plugs

Figure 2A:
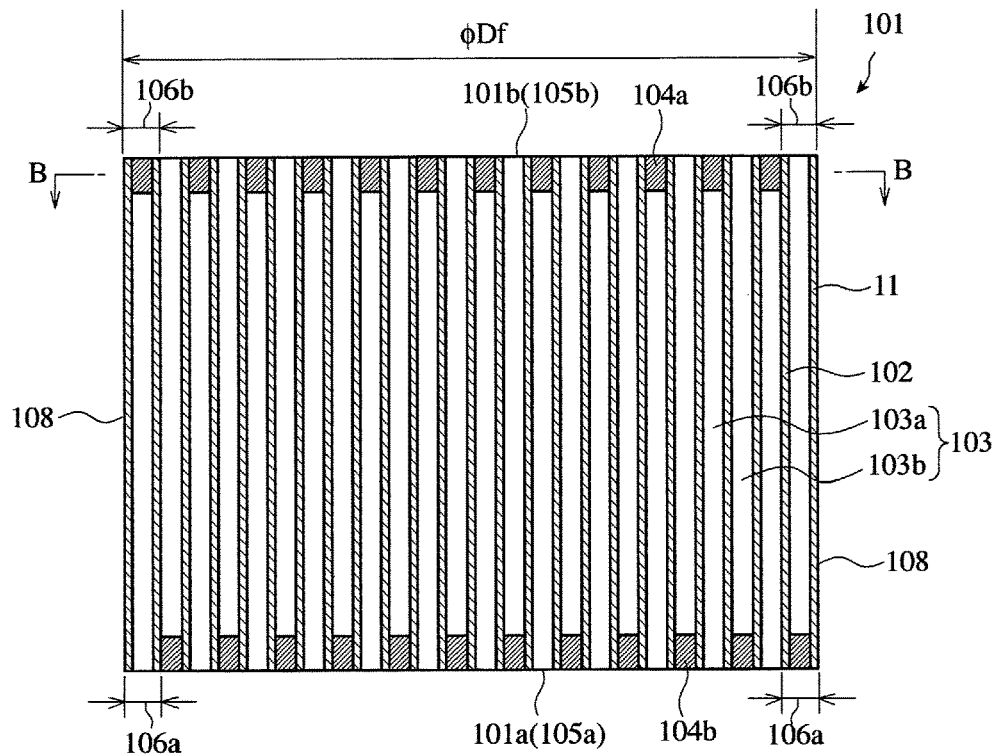
FIG. 2(a) is a cross-sectional view schematically showing an example of filters constituting the water-treating ceramic filter unit of the present invention, with its center axis included.
Figure 2B:
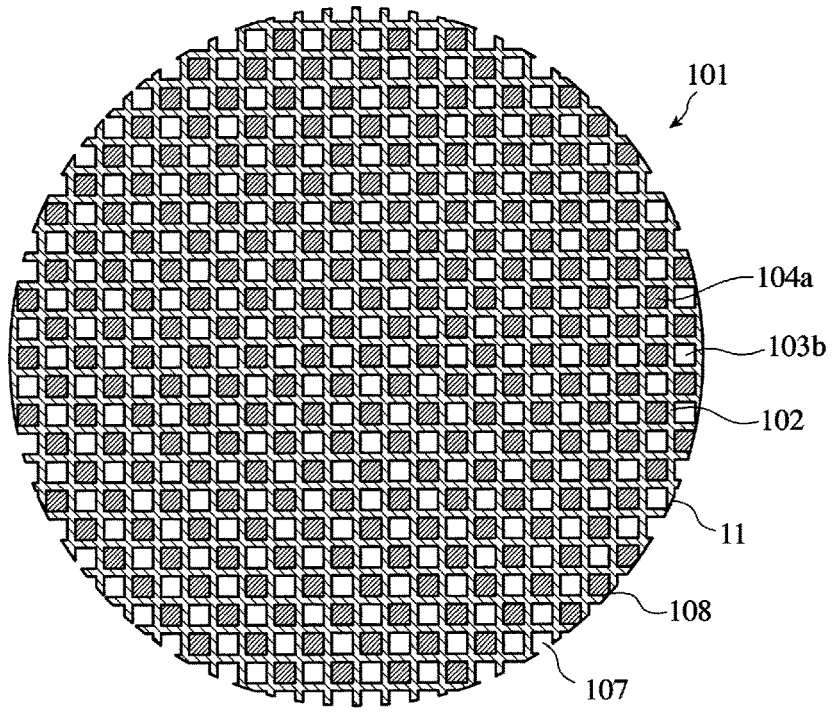
FIG. 2(b) is a cross-sectional view taken along the line B-B in FIG. 2(a).

Pluralities of flow paths 103 of the honeycomb structure 11 in the filter have necessary plugs in both end portions. FIGS. 2(a) and 2(b) show a filter 101 comprising the honeycomb structure 11 shown in FIGS. 3(a) and 3(b), in which end portions of predetermined flow paths among pluralities of flow paths 103 are provided with plugs 104a, 104b. In the filter 101, first flow paths 103b sealed by plugs 104b only at one end 101a, and second flow paths 103a sealed by plugs 104a only at the other end 101b are arranged adjacently to each other via the cell walls 102. Water to be treated does not directly flow into the first flow paths 103b whose one-side ends 101a are sealed by the plugs 104b, but flows into the second flow paths 103a open at the one-side ends 101a. However, because the second flow paths 103a are sealed by the plugs 104a at the other-side ends 101b, water to be treated inevitably passes through the communicating pores of the cell walls 102, and enters the first flow paths 103b open at the other-side ends 101b, the organic materials, etc. dissolved in water can be efficiently removed by adsorption.

The plugs 104a, 104b may be formed by water-insoluble materials such as the same material as that of the honeycomb structure 11 (the matrix of the cell walls 102), organic materials, other inorganic materials, etc. When they are formed by the same material as that of the honeycomb structure 11, a ceramic material slurry is introduced into predetermined end portions of the flow paths 103 and sintered. The organic materials may be polyimides, polyamides, polyimideamides, polyurethanes, acrylics, epoxy resins, polypropylene, tetrafluoroethylene, etc., and the other inorganic materials may be other ceramics than those forming the cell walls 102 (alumina, silica, magnesia, titania, zirconia, zircon, cordierite, spinel, aluminum titanate, lithium aluminum silicate, etc.), glass, etc. The plugs 104a, 104b may be formed by a known method.

The porosity of the plugs 104a, 104b is preferably 0-40%, and smaller than that of the cell walls 102. The longitudinal lengths of the plugs 104a, 104b are desirably larger than the thicknesses of the cell walls 102. When a material forming the plugs 104a, 104b has porosity of more than 40% or larger than that of the cell walls 102, water to be treated passes not only through the cell walls 102 but also through the plugs 104a, 104b, so that the dissolved organic materials, etc. not adsorbed onto pores (communicating pores) formed in the cell walls 102 are undesirably discharged from the filter 101.

(2) Housing

Figure 4:
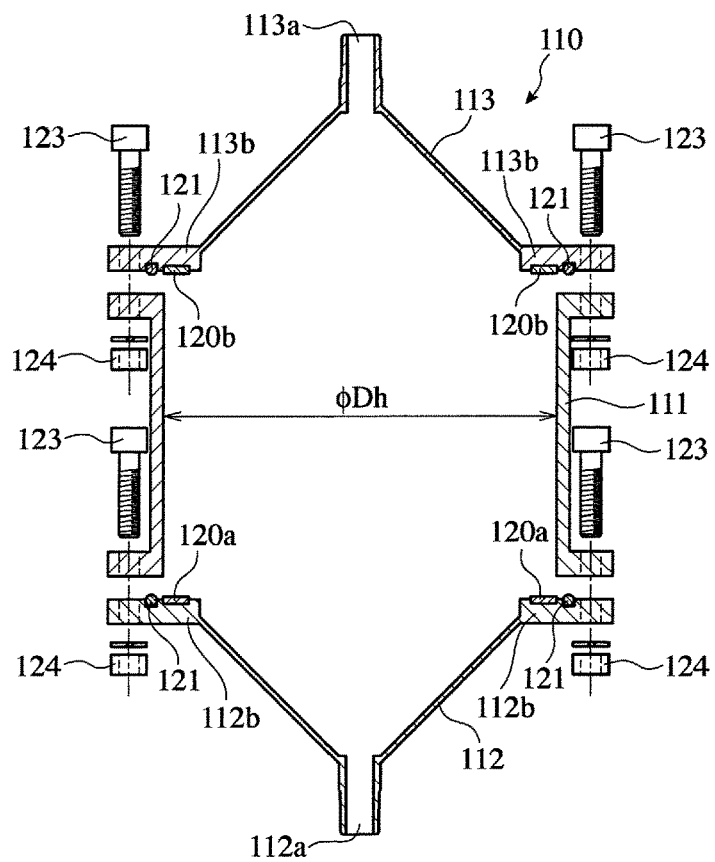
FIG. 4 is an exploded view showing an example of housings constituting the water-treating ceramic filter unit of the present invention.

As shown in FIGS. 1(a) and 1(b), the housing 110 integrally comprises a cylindrical filter container 111 for containing the filter 101 while covering its side surface 108, a supply-side lid 112 having an inlet 112a for supplying water to the second flow paths 103a of the filter 101 from outside, and a discharge-side lid 113 having an outlet 113a for discharging water from the first flow paths 103b of the filter 101 to outside. The term "integrally" means that the housing 110 has such water tightness as to avoid water supplied through the inlet 112a from exiting from other portions than the outlet 113a to outside. Members constituting the housing 110 may be separable as shown in FIG. 4. In the example of the housing 110 shown in FIGS. 1(a) and 4, the supply-side lid 112 and the discharge-side lid 113 are separable from the filter container 111, and they are fastened to the filter container 111 by bolts 123 and nuts 124 via sealing members 121 such as O-rings, etc., constituting an integral housing 110. A fastening method is not restrictive, but may be, for example, clamping.

One of the supply-side lid 112 and the discharge-side lid 113 may be integral to the filter container 111. In the housing 110' shown in FIGS. 5 and 6, for example, the discharge-side lid 113' is integral to the filter container 111', and only the supply-side lid 112 is fastened to the filter container 111' by bolts 123 and nuts 124 via a sealing member 121. This structure desirably reduces the number of members constituting the housing 110' and the number of steps of assembling the housing 110', and makes it easy to replace the contained filter 101.

Figure 5:
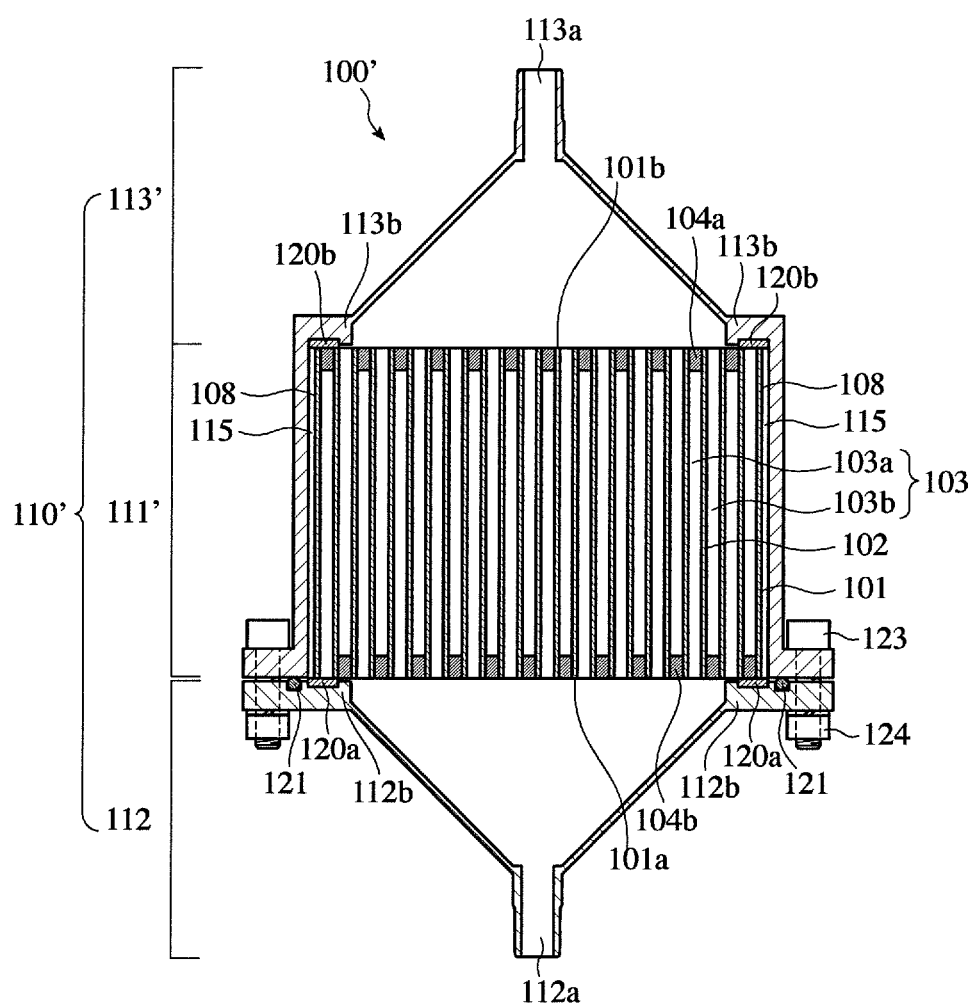
FIG. 5 is a schematic cross-sectional view showing another example of the water-treating ceramic filter units of the present invention.

The housing 110 (110') shown in FIGS. 1(a) and 5 is preferably formed by materials resistant to seawater and aqueous alkaline solutions, such as metals such as SUS304, SUS316, etc., and resins such as hard polyvinyl chloride (PVC), polyethylene (PE), etc. Because this makes the housing 110 (110') resistant to corrosion, the usable life of the water-treating ceramic filter unit of the present invention can be expanded.

The filter container 111 (111'), the supply-side lid 112, and the discharge-side lid 113 (113') may be made of the same material, or at least one member of them may be made of a material different from those of the other members. The use of different materials enhances the degree of freedom of size design taking into consideration the thermal expansion characteristics of the filter 101 and different thermal expansion characteristics of members constituting the housing 110 (110') in a use environment temperature range, making it possible to keep the performance of the water-treating ceramic filter unit 100 (100') of the present invention for a longer period of time.

(a) Filter Container

The equivalent diameter De of the flow paths 103 is a value (4Af/Wp) determined by measuring the cross section areas and peripheral lengths (total length of all inner sides of each flow path 103) of 10 or more arbitrary flow paths 103 in a cross section perpendicular to the longitudinal direction of the filter 101 shown in FIGS. 2(a) and 2(b), averaging them to obtain an average flow path cross section area Af and an average peripheral length Wp, and dividing a four-fold value of the average flow path cross section area Af by the average peripheral length Wp. In this case, the filter container 111 is designed such that the maximum of a gap 115 between the side surface 108 of the filter 101 and the housing 110 (filter container 111) [see FIG. 1(b)] is equal to or less than the equivalent diameter De of the flow paths 103 of the filter 101. Namely, as shown in FIG. 1(b), the difference of Dh and Df (Dh−Df) is preferably equal to or less than a twofold value of the equivalent diameter De, wherein Df is a diameter of a cylinder circumscribing the cylindrical filter 101, and Dh is the inner diameter of the filter container 111. With such a gap 115 between the side surface 108 of the filter 101 and the inner surface of the filter container 111, it is possible to reduce a time period during which the treated water leaking to the gap 115, if any, resides in the gap 115, enabling water to be treated to pass through the filter 101 uniformly. In the determination of the average cross section area Af and average peripheral length Wp of the flow paths, it may be considered to measure the cross section areas and peripheral lengths of all flow paths constituting the filter 101 (excluding incomplete flow paths described below), but it is enough to measure at least 10 flow paths arbitrarily selected in a filter when the filter has many flow paths. When each flow path 103 has a square cross section having a side w, the equivalent diameter De is equal to w (De=w), because Af=w², and Wp=4w. The maximum of the gap 115 is preferably 0.1 mm or more.

(b) Supply-Side Lid and Discharge-Side Lid

In FIG. 1(a), the supply-side lid 112 has a first flange 112b abutting the first seal member 120a disposed on the first outer edge portion 106a of the filter 101 [see FIG. 1(d)], and the discharge-side lid 113 has a second flange 113b abutting the second seal member 120b disposed on the second outer edge portion 106b of the filter 101 [see FIG. 1(c)]. The first and second flanges 112b 113b contribute to fixing the filter 101 with the first and second seal members 120a, 120b disposed between the filter 101 and them as described below.

(3) Seal Members

As shown in FIGS. 1(a)-1(d), the filter 101 is fixed by the first flange 112b of the supply-side lid 112 and the second flange 113b of the discharge-side lid 113, via the first seal member 120a disposed on the first outer edge portion 106a and the second seal member 120b disposed on the second outer edge portion 106b. The first seal member 120a acts to prevent water supplied through the inlet 112a from directly entering the gap 115, and the second seal member 120b acts to prevent water leaking into the gap 115 from being discharged directly from the outlet 113a without returning to the filter 101. Thereby, substantially all water supplied through the inlet 112a can uniformly pass through the filter 101. Both of the first and second seal members 120a, 120b are made of an elastic material, acting as a buffer in assembling the filter 101 into the housing 110 to prevent the breakage of the filter 101, and surely fixing the filter 101 in the housing 110 by its proper repulsive force.

The first seal member 120a has a shape covering the first outer edge portion 106a of the filter 101, and the second seal member 120b has a shape covering the second outer edge portion 106b of the filter 101 (for example, they are substantially circular when the filter 101 is cylindrical), and both of their shapes ensure them to be disposed between the filter 101 and the housing 110 without existing in the gap 115, such that they are compressed only in the longitudinal direction of the filter 101 (the direction of the flow paths 103). With this structure, the filter 101 can be fixed without applying a load directly to the side surface 108 of the filter 101, improving the durability of the water-treating ceramic filter unit 100.

The first and second seal members 120a, 120b preferably have a flat cross section having larger radial width (hereinafter simply called "width") than axial thickness (hereinafter simply called "thickness") for good fixing of the filter 101 and good sealing of the gap 115, and their outer peripheries are preferably equal to or slightly larger than the outer periphery of the filter 101 when viewed in a longitudinal direction.

Though variable depending on the length, etc. of the filter 101, the preferred thicknesses of the first and second seal members 120a, 120b when the filter 101 is fixed in the housing 110 are preferably 75% or more of those when no load is applied to the first and second seal members 120a, 120b. In other words, the thickness, hardness, etc. of the first and second seal members 120a, 120b are designed preferably such that their thickness reduction ratios (hereinafter called "flattening ratios") when there is a longitudinal load applied to them between the housing 110 and the filter 101 are 25% or less of those when there is no load. When the flattening ratio is more than 25%, the seal members 120a, 120b lose elasticity, undergoing permanent strain, so that they can unlikely fix the filter 101 and seal the gap 115.

Next, the widths of the first and second seal members 120a, 120b when the filter 101 is fixed in the housing 110 will be explained. For example, when a honeycomb structure 11 having no outer wall on the side surface 108 is used for the filter 101, there are flow paths having no cell walls 102 on the side surface 108 of the filter 101, namely flow paths whose cell walls 102 are removed on the side surface 108, which are hereinafter called "incomplete flow paths 107" [see FIGS. 1(b), 2(b), 3(b) and 3(c)]. Because such incomplete flow paths 107 are usually not plugged on both of the one-side ends 101a and the other-side ends 101b, water to be treated, which flows into the incomplete flow paths 107, would be discharged without passing through the cell walls 102. In order for water to be treated to pass through the cell walls 102 of the filter 101 uniformly, these incomplete flow paths 107 on the outermost periphery of the first and second outer edge portions 106a, 106b should also be completely covered by the first and second seal members 120a, 120b. Accordingly, the widths of the first and second seal members 120a, 120b should be larger than the maximum opening length of the flow paths 103 in the first and second outer edge portions 106a, 106b. For example, when the flow paths 103 have a square end surface shape, the maximum opening length of the flow paths 103 is the length of a diagonal line of the square. Therefore, the widths of the first and second seal members 120a, 120b are preferably larger than the opening lengths of the flow paths. Also, to avoid the flow paths 103 from being excessively closed due to the misalignment of the first and second seal members 120a, 120b from the housing 110, the widths of the first and second seal members 120a, 120b are preferably 1.5-4.0 times the pitch of adjacent flow paths 103 in the first and second outer edge portions 106a, 106b. In adjacent flow paths 103 in the first and second outer edge portions 106a, 106b, the pitch is a sum of the thickness d of the cell wall 102 and the equivalent diameter De of the flow path 103. For example, when the flow paths 103 are in a square shape having a side w, the equivalent diameter De is equal to w, so that the pitch is a sum (d+w) of the thickness d of the cell wall 102 and the width w of the flow path.

The first and second seal members 120a, 120b are made of an elastic material, whose hardness can be measured by a type-A durometer according to JIS K6253. With too low hardness, they undesirably provides an insufficient repulsive force when sandwiched by the housing 110 and the filter 101, so that part of water to be treated is likely discharged directly from the gap 115 through the outlet 113a to outside without passing through the filter 101. On the other hand, with too high hardness, they are less deformed along the contact area roughness of the filter 101, so that stress is concentrated in particular portions of the filter 101, partially cracking the cell walls 102 and thus undesirably discharging water containing cracked ceramic pieces from the outlet 113a. Though variable depending on the strength and contact area roughness of the filter 101, a proper range of the hardness of the elastic material forming the first and second seal members 120a, 120b, which is measured by the above type-A durometer, is preferably A30 to A80, and more preferably A50 to A70.

The elastic material forming the first and second seal members 120a, 120b is preferably at least one selected from the group consisting of nitrile rubber (NBR), ethylene-propylene rubber (EPDM) and silicone rubber, taking resistance to seawater, sodium hydroxide solutions, hydrochloric acid, etc. into consideration. The first and second seal members 120a 120b may be formed by different materials.

EXAMPLE

The present invention will be explained in further detail by Examples, without intention of restricting the present invention thereto.

Example 1

Powders of kaolin, talc, silica, aluminum hydroxide and alumina were mixed to obtain a cordierite-forming powder having a chemical composition comprising 50% by mass of $SiO_2$, 36% by mass of $Al_2O_3$, and 14% by mass of MgO. This cordierite-forming powder was mixed with methylcellulose and hydroxypropyl methylcellulose as molding aids, and thermally expandable microcapsule as a pore-forming material, and sufficiently blended with a proper amount of ion-exchanged water to prepare an extrusion-moldable material for a honeycomb structure.

The moldable material was extruded to form a honeycomb-structure green body, which was dried, machined to adjust its axial and radial lengths, and sintered at 1400° C. for 24 hours, to obtain a sintered cylindrical honeycomb structure 11 having incomplete flow paths 107 with cell walls 102 at least partially removed on the side surface 108 as shown in FIGS. 3(a) to 3(c).

A plugging slurry comprising the cordierite-forming material was alternately charged into the one-side and other-side ends 101a, 101b of the flow paths 103 of the honeycomb structure 11 for plugging, dried, and then sintered to obtain a cylindrical, porous ceramic filter 101 having an outer diameter Df of 127 mm and a length of 152.4 mm, with the cell walls 102 having thickness of 0.76 mm, and the flow paths 103 having a pitch of 2.75 mm and an equivalent diameter De of 1.99 mm, as shown in FIGS. 2(a) and 2(b).

Figure 6:
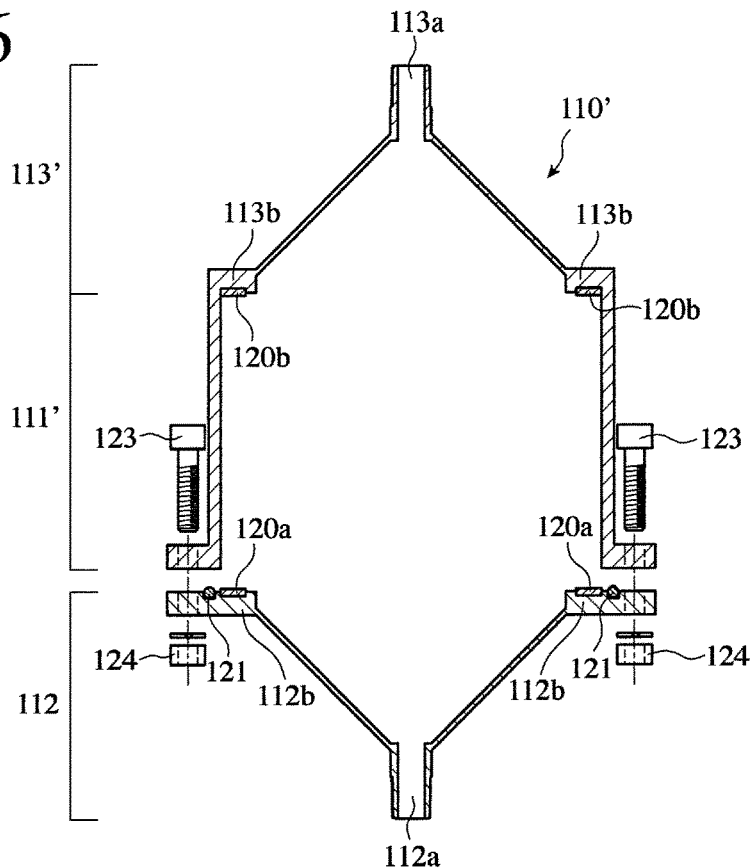
FIG. 6 is an exploded view showing another example of housings constituting the water-treating ceramic filter unit of the present invention.

The filter 101 was fixed in the housing 110' via the first and second seal members 120a, 120b as shown in FIG. 6, to produce the water-treating ceramic filter unit 100' of the present invention shown in FIG. 5 as described below.

All of the filter container 111', the supply-side lid 112, and the discharge-side lid 113' were made of SUS304. The filter container 111' had an outer diameter of 137 mm, an inner diameter of 129 mm, and a length of 160 mm, and was integrally combined with the discharge-side lid 113'. The second flange 113b had a width of 10 mm from the inner surface of the filter container 111'. The supply-side lid 112 was separable from the filter container 111', and fastened to the filter container 111' by bolts 123 and nuts 124 via the sealing member 121. The width of the first flange 112b when fastened to the filter container 111' was 10 mm from the inner surface of the filter container 111'.

Both of the first and second seal members 120a, 120b were made of nitrile rubber (hardness A70) and in a cylindrical shape having an outer diameter of 128 mm, an inner diameter of 108 mm and a thickness of 5 mm when no load was applied.

With the second seal member 120b disposed on the second flange 113b of the discharge-side lid 113' integral to the filter container 111', the filter 101 was assembled into the filter container 111'. With the first seal member 120a disposed on the first outer edge portion 106a of the filter 101, and the first flange 112b of the supply-side lid 112 disposed on the first seal member 120a, the longitudinal fastening of the supply-side lid 112 and the discharge-side lid 113' to the filter container 111' was conducted by bolts 123 and nuts 124 via a sealing member (O-ring) 121, to obtain the water-treating ceramic filter unit 100'. In this water-treating ceramic filter unit 100', the maximum of a gap 115 between the side surface 108 of the filter 101 and the housing 110' (filter container 111') was 1.0 mm.

When fixed in the housing 110', the thickness reduction (flattening margin) of the first and second seal members 120a, 120b from a state in which no load was applied was 1.20 mm at 25° C. Because the thickness was 5 mm in a state in which no load was applied, the thicknesses of the first and second seal members 120a, 120b fixed in the housing 110' were 3.80 mm. Namely, the thicknesses of the first and second seal members 120a, 120b when the filter 101 was fixed were 76% of that when no load was applied (flattening ratio was 24%). Incidentally, the size changes of the filter 101 and the housing 110' were as small as 0.1 mm or less in a use environment temperature range of 10-40° C., with substantially no change in the flattening ratio.

Comparative Example 1

The filter of Comparative Example 1 was a porous ceramic filter having an outer diameter of 127 mm and a length of 152.4 mm, with cell walls having a thickness of 0.76 mm and a pitch of 2.75 mm, which was produced in the same manner as in Example 1, except that a coating material containing cordierite particles and colloidal silica was applied to a side surface of a honeycomb structure provided with plugs, dried and then sintered to form an outer wall.

Figure 8:
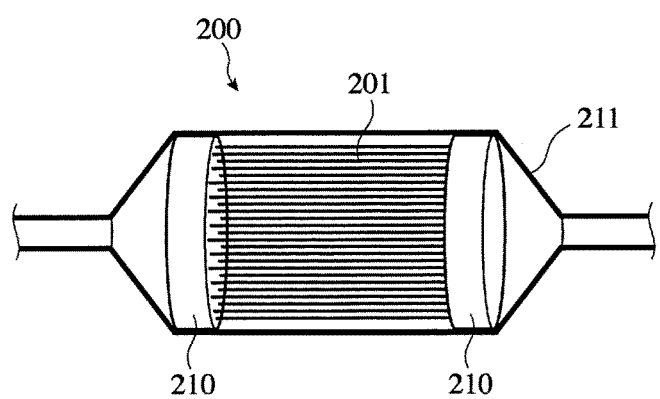
FIG. 8 is a schematic view showing the water-treating ceramic filter unit of Comparative Example 1.

Using the resultant filter, the water-treating ceramic filter unit 200 of Comparative Example 1 as shown in FIG. 8 was produced. The water-treating ceramic filter unit 200 of Comparative Example 1 comprised the filter 201 of Comparative Example 1, filter supports 210 (stainless steel meshes) holding both end surfaces of the filter 201 via holding members (not shown), and a SUS304-made housing 211 containing the filter 201 and the filter supports 210. In this water-treating ceramic filter unit 200, the maximum of a gap between the side surface of the filter 201 and the housing 211 was 2.0 mm.

(1) Filtration Test of Artificial Particulate-Contaminated Water

To compare contaminant-capturing performance, a filtration test of artificial particulate-contaminated water was conducted using the water-treating ceramic filter units of Example 1 and Comparative Example 1. The artificial particulate-contaminated water was obtained by adding 100 mg of SiC particulates having particle sizes of #1000 (average particle diameter: about 15 μm) as artificial contaminating particulates to 1 L of water. 35 L per minute of artificial particulate-contaminated water was circulated through each water-treating ceramic filter unit of Example 1 and Comparative Example 1, and water samples were taken from the water-treating ceramic filter units of Example 1 and Comparative Example 1 on both inlet and outlet sides 30 minutes, 60 minutes, and 360 minutes after starting the supply of water, to measure their SiC concentrations. The results are shown in Table 1.

TABLE 1

| | Concentration of SiC (mg/L) | | | |
| --- | --- | --- | --- | --- |
| Time | Example 1 | | Comparative Example 1 | |
| Lapsed | Inlet Side | Outlet Side | Inlet Side | Outlet Side |
| After 30 Minutes | 10 | 0 | 25 | 25 |
| After 60 Minutes | 0 | 0 | 19 | 17 |
| After 360 Minutes | 0 | 0 | 17 | 18 |

Table 1 shows that the SiC concentration was 0 mg/L in water on both inlet and outlet sides after 60 minutes in Example 1, while it was 17 mg/L in inlet-side water and 18 mg/L in discharge-side water even after 360 minutes in Comparative Example 1, indicating that the water-treating ceramic filter unit 100' of Example 1 had high performance of capturing contaminating particulates. The high capturing efficiency of the water-treating ceramic filter unit 100' of Example 1 is considered due to the fact that the first and second seal members 120a, 120b caused the artificial particulate-contaminated water to pass through the filter 101 uniformly. On the other hand, the water-treating ceramic filter unit 200 of Comparative Example 1 exhibited poor capturing efficiency, presumably because the artificial particulate-contaminated water easily entered a gap between the outer wall of the filter and the inner wall of the housing, so that a considerable percentage of water did not pass through the filter (flew through the filter without capturing).

Example 2

A filter (outer diameter: 125 mm, length: 152.4 mm, cell wall thickness: 0.76 mm, cell pitch: 2.75 mm, and equivalent diameter: 1.99 mm) produced in the same manner as in Example 1 was fixed in the same housing (a filter container having an outer diameter of 140 mm, an inner diameter of 126 mm, and a length of 161.6 mm) as in Example 1 except that it was formed by polyethylene, via first and second seal members 120a, 120b made of nitrile rubber (hardness: A70), both having an outer diameter of 126 mm, an inner diameter of 106 mm, and a thickness of 5 mm when no load was applied, to produce a water-treating ceramic filter unit. The above sizes were measured at 25° C. When fixed in the water-treating ceramic filter unit at 25° C., the flattening margins of both first and second seal members 120a, 120b were 0.4 mm (flattening ratio: 8%), meaning that their thicknesses were reduced to 92% of those when no load was applied. Though there was substantially no size change in the filter 101 in a use environment temperature range of 10-40° C., the longitudinal length of the polyethylene-made housing 110' changed in a range of 0.32 mm from the size at 25° C., meaning that the flattening margins of the first and second seal members 120a, 120b changed by half, +0.16 mm. Namely, their flattening margins were 0.56 mm (flattening ratio: 11%) at 10° C., meaning that the thicknesses of the first and second seal members 120a, 120b were 89% of those when no load was applied. Also, their flattening margins were 0.24 mm (flattening ratio: 5%) at 40° C., meaning that the thicknesses of the first and second seal members 120a, 120b were 95% of those when no load was applied.

Comparative Example 2

A filter (outer diameter: 125 mm, length: 152.4 mm, cell wall thickness: 0.76 mm, pitch: 2.75 mm, and equivalent diameter: 1.99 mm) produced in the same manner as in Example 1 was fixed in the same housing (a filter container having an outer diameter of 140 mm, an inner diameter of 126 mm, and a length of 161.6 mm) as shown in Example 2, except for using 0-rings each having a circular cross section in place of the first and second seal members 120a, 120b, to obtain the water-treating ceramic filter unit of Comparative Example 2. Each O-ring was P-115 of standard size (outer diameter: 126 mm, inner diameter: 114.6 mm, and thickness: 5.7 mm) made of nitrile rubber (hardness: A70). In the water-treating ceramic filter unit of Comparative Example 2, the filter container had a length of 161.6 mm, such that the O-ring had a standard flattening margin of 1.1 mm.

(2) Observation of Water to be Treated Passing Through Filter in Use Temperature Range Table 2 shows the contact area widths of the first and second seal members 120a, 120b and the O-rings when the water-treating ceramic filter units of Example 2 and Comparative Example 2 were used in environments of 10° C., 25° C., and 40° C. The contact area width is defined as follows: When each of the seal members 120a, 120b and the O-ring is flattened by two parallel plates, the contact area width is a radial width of a portion in which each of the first and second seal members 120a, 120b and the O-rings comes into contact with one plate. The first and second seal members 120a, 120b used in Example 2 had substantially unchangeable contact area widths, while the contact area widths of the O-rings used in Comparative Example 2 changed with the temperature. It was also found that in the water-treating ceramic filter unit of Comparative Example 2 using standard O-rings, part of water supplied through the inlet was discharged from the outlet without passing through the filter. This is because the contact area width of the O-ring was less than 4.1 mm, 1.5 times the pitch of flow paths, failing to cover both end portions of flow paths with no plugs, which existed in the outer peripheral portion of the filter.

TABLE 2

| | Width of Contact Area (mm) | |
|---|---|---|
| Temperature | Example 2 | Com. Ex. 2 |
| 10° C. | 10.0 | 3.6 |
| 25° C. | 10.0 | 3.4 |
| 40° C. | 10.0 | 3.1 |

What is claimed is:

1. A water-treating filter unit comprising
a columnar filter having pluralities of flow paths partitioned by pluralities of porous ceramic cell walls and extending in one direction, a first end, a second end, pluralities of said flow paths being composed of first flow paths plugged only on the side of said first end, and second flow paths plugged only on the side of said second end;
a first elastic seal member arranged along a first outer edge portion of the first end surface of said filter, and a second elastic seal member arranged along a second outer edge portion of the second end surface of said filter, and
a housing integrally comprising a supply-side lid having an inlet for supplying water to said second flow paths from outside, and a first flange abutting said first seal member disposed on said first outer edge portion; a discharge-side lid having an outlet for discharging water from said first flow paths to outside, and a second flange abutting said second seal member disposed on said second outer edge portion; and a filter container connected to said supply-side lid and said discharge-side lid and covering a side surface of said filter;
said filter being fixed by said first flange and said second flange, via said first seal member and said second seal member; and
the maximum of a gap between the side surface of said filter and said housing being equal to or less than the equivalent diameter of said flow paths, wherein said equivalent diameter is a value determined by measuring the cross section areas and peripheral lengths of 10 or more arbitrary flow paths in a cross section perpendicular to the longitudinal direction of said filter, averaging them to obtain the average cross section area and average peripheral length of said flow paths, and dividing a fourfold value of said average cross section area of the flow paths by said average peripheral length.

2. The water-treating ceramic filter unit according to claim 1, wherein said first flow paths and said second flow paths are arranged adjacently to each other.

3. The water-treating ceramic filter unit according to claim 1, wherein the thicknesses of said first and second seal members when said filter is fixed are 75% or more of those of said first and second seal members when no load is applied to them.

4. The water-treating ceramic filter unit according to claim 1, wherein the widths of said first and second seal members when said filter is fixed are 1.5-4.0 times the pitch of said flow paths in said first and second outer edge portions.

5. The water-treating ceramic filter unit according to claim 1, wherein an elastic material forming said first and second seal members has hardness of A30 to A80 when measured by a type-A durometer according to JIS K6253.

6. The water-treating ceramic filter unit according to claim 5, wherein said elastic material forming said first and second seal members is at least one selected from the group consisting of nitrile rubbers, ethylene-propylene rubbers and silicone rubbers.

7. The water-treating ceramic filter unit according to claim 1, wherein said filter has flow paths partially not partitioned by said cell walls on the side surface.

8. The water-treating ceramic filter unit according to claim 1, wherein at least one of said supply-side lid, said discharge-side lid and said filter container constituting said housing is formed by a material different from at least one of said supply-side lid, said discharge-side lid and said filter container constituting said housing.

9. The water-treating ceramic filter unit according to claim 1, wherein one of said supply-side and discharge-side lids of said housing is integral to said filter container.

10. The water-treating ceramic filter unit according to claim 1, wherein said housing is formed by a material resistant to aqueous alkaline solutions.

\* \* \* \* \*